United States Patent
Miller et al.

(10) Patent No.: US 7,454,035 B2
(45) Date of Patent: *Nov. 18, 2008

(54) DIGITAL WATERMARKING SYSTEMS AND METHODS

(75) Inventors: Marc D. Miller, Corte Madera, CA (US); Kenneth L. Levy, Stevenson, WA (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 299 days.

This patent is subject to a terminal disclaimer.

(21) Appl. No.: 11/361,671

(22) Filed: Feb. 24, 2006

(65) Prior Publication Data

US 2007/0053549 A1 Mar. 8, 2007

Related U.S. Application Data

(60) Continuation of application No. 10/278,742, filed on Oct. 21, 2002, now Pat. No. 7,006,661, which is a continuation-in-part of application No. 10/017,678, filed on Dec. 13, 2001, now Pat. No. 7,050,603, which is a continuation of application No. 09/597,209, filed on Jun. 20, 2000, now Pat. No. 6,411,725, which is a continuation-in-part of application No. 09/408,902, filed on Sep. 29, 1999, now Pat. No. 6,408,331, which is a division of application No. 09/130,624, filed on Aug. 6, 1998, now Pat. No. 6,324,573, which is a continuation of application No. 08/508,083, filed on Jul. 27, 1995, now Pat. No. 5,841,978.

(60) Provisional application No. 60/349,970, filed on Oct. 19, 2001.

(51) Int. Cl.
*G06K 9/00* (2006.01)

(52) U.S. Cl. .......................... 382/100; 382/236; 380/201
(58) Field of Classification Search ................. 382/100, 382/154, 168, 181, 232, 243, 233–236, 274, 382/276, 287–295, 305, 107, 254; 280/228; 709/217; 380/54, 234, 201
See application file for complete search history.

(56) References Cited

U.S. PATENT DOCUMENTS 4,238,849 A 12/1980 Gassmann (Continued)

FOREIGN PATENT DOCUMENTS

EP 1077570 2/2001

(Continued)

OTHER PUBLICATIONS

Burgett et al., "A Novel Method for Copyright Labeling Digitized Image Data," Sep. 18, 1995, 12 pages.

(Continued)

*Primary Examiner*—Seyed Azarian

(57) ABSTRACT

The present invention relates to digital watermarking systems and methods. In a first implementation, so-called movie studio rough-cuts are watermarked to provide a forensic tracking clue or to provide security for distributed rough-cuts. In another implementation, a watermark is determined for a compressed video object. The watermark is compressed as an object and the watermarked object is then associated with the compressed video object. The two separate objects are provided to a rendering device, which after decompressing both objects, embeds the watermark in the video prior to rendering.

20 Claims, 3 Drawing Sheets

U.S. PATENT DOCUMENTS

| | | | |
|---|---|---|---|
| 4,528,588 A | 7/1985 | Lofberg | |
| 4,829,569 A * | 5/1989 | Seth-Smith et al. | 380/234 |
| 5,228,056 A | 7/1993 | Schilling | |
| 5,428,606 A | 6/1995 | Moskowitz | |
| 5,526,427 A | 6/1996 | Thomas et al. | |
| 5,613,004 A | 3/1997 | Cooperman et al. | |
| 5,636,292 A | 6/1997 | Rhoads | |
| 5,646,997 A | 7/1997 | Barton | |
| 5,664,018 A | 9/1997 | Leighton | |
| 5,715,403 A | 2/1998 | Stefik | |
| 5,719,937 A | 2/1998 | Warren | |
| 5,748,763 A | 5/1998 | Rhoads | |
| 5,765,152 A | 6/1998 | Erickson | |
| 5,768,426 A | 6/1998 | Rhoads | |
| 5,774,452 A | 6/1998 | Wolosewicz | |
| 5,809,317 A | 9/1998 | Kogan et al. | |
| 5,822,436 A | 10/1998 | Rhoads | |
| 5,838,906 A | 11/1998 | Doyle et al. | |
| 5,841,978 A | 11/1998 | Rhoads | |
| 5,845,281 A | 12/1998 | Benson | |
| 5,862,260 A | 1/1999 | Rhoads | |
| 5,892,900 A | 4/1999 | Ginter et al. | |
| 5,901,178 A | 5/1999 | Lee | |
| 5,905,800 A | 5/1999 | Moskowitz et al. | |
| 5,910,987 A | 6/1999 | Ginter et al. | |
| 5,915,027 A | 6/1999 | Cox | |
| 5,933,798 A | 8/1999 | Linnartz | |
| 5,940,504 A | 8/1999 | Griswold | |
| 5,943,422 A | 8/1999 | Van Wie et al. | |
| 5,949,885 A * | 9/1999 | Leighton | 380/54 |
| 5,963,909 A | 10/1999 | Warren | |
| 5,991,876 A | 11/1999 | Johnson et al. | |
| 5,995,625 A | 11/1999 | Sudia | |
| 6,018,369 A | 1/2000 | Patterson | |
| 6,021,491 A * | 2/2000 | Renaud | 713/179 |
| 6,078,664 A | 6/2000 | Moskowitz et al. | |
| 6,086,706 A | 7/2000 | Brasil | |
| 6,104,812 A | 8/2000 | Koltai et al. | |
| 6,115,741 A | 9/2000 | Domenikos et al. | |
| 6,122,403 A | 9/2000 | Rhoads | |
| 6,141,753 A | 10/2000 | Zhao et al. | |
| 6,175,639 B1 | 1/2001 | Satoh et al. | |
| 6,185,312 B1 | 2/2001 | Nakamura et al. | |
| 6,185,683 B1 | 2/2001 | Ginter et al. | |
| 6,192,138 B1 | 2/2001 | Yamadaji | |
| 6,199,076 B1 | 3/2001 | Logan et al. | |
| 6,209,092 B1 | 3/2001 | Linnartz | |
| 6,216,228 B1 | 4/2001 | Chapman | |
| 6,233,684 B1 | 5/2001 | Stefik | |
| 6,236,971 B1 | 5/2001 | Stefik | |
| 6,240,185 B1 | 5/2001 | Van Wie et al. | |
| 6,243,480 B1 | 6/2001 | Zhao et al. | |
| 6,263,087 B1 | 7/2001 | Miller | |
| 6,269,394 B1 * | 7/2001 | Kenner et al. | 709/217 |
| 6,272,176 B1 | 8/2001 | Srinivasan | |
| 6,272,634 B1 | 8/2001 | Tewfik et al. | |
| 6,282,654 B1 | 8/2001 | Ikeda et al. | |
| 6,285,774 B1 | 9/2001 | Schumann | |
| 6,298,142 B1 | 10/2001 | Nakano | |
| 6,310,962 B1 | 10/2001 | Chung et al. | |
| 6,314,192 B1 | 11/2001 | Chen et al. | |
| 6,324,573 B1 | 11/2001 | Rhoads | |
| 6,332,031 B1 | 12/2001 | Rhoads et al. | |
| 6,334,187 B1 | 12/2001 | Kadono | |
| 6,351,815 B1 | 2/2002 | Adams | |
| 6,373,960 B1 | 4/2002 | Conover et al. | |
| 6,398,245 B1 * | 6/2002 | Gruse et al. | 280/228 |
| 6,408,082 B1 | 6/2002 | Rhoads et al. | |
| 6,408,331 B1 | 6/2002 | Rhoads | |
| 6,411,725 B1 | 6/2002 | Rhoads | |
| 6,418,232 B1 | 7/2002 | Nakano et al. | |
| 6,425,081 B1 | 7/2002 | Iwamura | |
| 6,456,726 B1 | 9/2002 | Yu et al. | |
| 6,466,670 B1 | 10/2002 | Tsuria et al. | |
| 6,477,707 B1 | 11/2002 | King et al. | |
| 6,493,457 B1 | 12/2002 | Quackenbush | |
| 6,499,105 B1 | 12/2002 | Yoshiura et al. | |
| 6,505,160 B1 | 1/2003 | Levy et al. | |
| 6,522,769 B1 | 2/2003 | Rhoads et al. | |
| 6,535,614 B1 | 3/2003 | Kimura | |
| 6,574,350 B1 | 6/2003 | Rhoads | |
| 6,587,944 B2 | 7/2003 | Yeung | |
| 6,601,046 B1 | 7/2003 | Epstein | |
| 6,611,607 B1 | 8/2003 | Davis et al. | |
| 6,614,914 B1 | 9/2003 | Rhoads et al. | |
| 6,654,887 B2 | 11/2003 | Rhoads | |
| 6,664,976 B2 | 12/2003 | Lofgren et al. | |
| 6,721,440 B2 | 4/2004 | Reed et al. | |
| 6,728,390 B2 | 4/2004 | Rhoads et al. | |
| 6,748,533 B1 | 6/2004 | Wu et al. | |
| 6,757,407 B2 | 6/2004 | Bruckstein et al. | |
| 6,785,815 B1 | 8/2004 | Serret-Avila et al. | |
| 6,788,800 B1 | 9/2004 | Carr et al. | |
| 6,807,285 B1 | 10/2004 | Iwamura | |
| 6,947,571 B1 | 9/2005 | Rhoads et al. | |
| 7,050,603 B2 | 5/2006 | Rhoads et al. | |
| 7,055,034 B1 | 5/2006 | Levy | |
| 7,062,068 B2 * | 6/2006 | Hirai et al. | 382/100 |
| 7,197,156 B1 | 3/2007 | Levy | |
| 7,224,819 B2 | 5/2007 | Levy et al. | |
| 7,373,513 B2 | 5/2008 | Levy | |
| 2001/0001613 A1 | 5/2001 | Hashimoto | |
| 2001/0016052 A1 | 8/2001 | Miller | |
| 2001/0017885 A1 | 8/2001 | Asai et al. | |
| 2001/0018742 A1 | 8/2001 | Hirai | |
| 2001/0021144 A1 | 9/2001 | Oshima et al. | |
| 2001/0024510 A1 | 9/2001 | Iwamura | |
| 2001/0026377 A1 | 10/2001 | Ikegami | |
| 2001/0026618 A1 | 10/2001 | Van Wie | |
| 2001/0032312 A1 | 10/2001 | Runje | |
| 2001/0033674 A1 | 10/2001 | Chen | |
| 2001/0037465 A1 | 11/2001 | Hart | |
| 2001/0044899 A1 | 11/2001 | Levy | |
| 2001/0047478 A1 | 11/2001 | Mase | |
| 2001/0051996 A1 | 12/2001 | Cooper et al. | |
| 2001/0054144 A1 | 12/2001 | Epstein et al. | |
| 2001/0055391 A1 | 12/2001 | Jacobs | |
| 2002/0010826 A1 | 1/2002 | Takahashi | |
| 2002/0013772 A1 | 1/2002 | Peinado | |
| 2002/0023058 A1 | 2/2002 | Taniguchi et al. | |
| 2002/0032502 A1 | 3/2002 | Russell | |
| 2002/0032698 A1 | 3/2002 | Cox | |
| 2002/0033844 A1 | 3/2002 | Levy et al. | |
| 2002/0052885 A1 | 5/2002 | Levy | |
| 2002/0056081 A1 | 5/2002 | Morley | |
| 2002/0056118 A1 | 5/2002 | Hunter | |
| 2002/0059238 A1 | 5/2002 | Saito | |
| 2002/0061120 A1 | 5/2002 | Carr et al. | |
| 2002/0061122 A1 | 5/2002 | Fujihara et al. | |
| 2002/0062442 A1 | 5/2002 | Kurahashi | |
| 2002/0064759 A1 | 5/2002 | Durbin et al. | |
| 2002/0065781 A1 | 5/2002 | Hillegass | |
| 2002/0065832 A1 | 5/2002 | Mack | |
| 2002/0069359 A1 | 6/2002 | Wantanabe | |
| 2002/0069370 A1 | 6/2002 | Mack | |
| 2002/0071556 A1 | 6/2002 | Moskowitz et al. | |
| 2002/0080271 A1 | 6/2002 | Eveleens | |
| 2002/0080964 A1 | 6/2002 | Stone et al. | |
| 2002/0087885 A1 | 7/2002 | Peled | |
| 2002/0090114 A1 | 7/2002 | Rhoads et al. | |
| 2002/0091575 A1 | 7/2002 | Collart | |
| 2002/0091592 A1 | 7/2002 | Sugiura | |
| 2002/0107803 A1 | 8/2002 | Lisanke | |
| 2002/0108050 A1 | 8/2002 | Raley | |

| | | | |
|---|---|---|---|
| 2002/0111136 | A1 | 8/2002 | McCoy |
| 2002/0111878 | A1 | 8/2002 | Namba et al. |
| 2002/0114458 | A1 | 8/2002 | Belenko |
| 2002/0120515 | A1 | 8/2002 | Morimoto et al. |
| 2002/0120517 | A1 | 8/2002 | Proidl |
| 2002/0122567 | A1 | 9/2002 | Kuzmich et al. |
| 2002/0138744 | A1 | 9/2002 | Schleicher et al. |
| 2002/0141584 | A1 | 10/2002 | Razdan |
| 2002/0146148 | A1 | 10/2002 | Levy |
| 2002/0152388 | A1 | 10/2002 | Linnartz |
| 2002/0165793 | A1 | 11/2002 | Brand |
| 2002/0168082 | A1 | 11/2002 | Razdan |
| 2002/0188841 | A1 | 12/2002 | Jones et al. |
| 2003/0009669 | A1 | 1/2003 | White |
| 2003/0009671 | A1 | 1/2003 | Yacobi et al. |
| 2003/0012548 | A1 | 1/2003 | Levy et al. |
| 2003/0021439 | A1 | 1/2003 | Lubin et al. |
| 2003/0032033 | A1 | 2/2003 | Anglin et al. |
| 2003/0035565 | A1 | 2/2003 | Rhoads |
| 2003/0037010 | A1 | 2/2003 | Schmelzer |
| 2003/0056103 | A1 | 3/2003 | Levy et al. |
| 2003/0076955 | A1 | 4/2003 | Alve |
| 2003/0078889 | A1 | 4/2003 | Lee et al. |
| 2003/0084284 | A1 | 5/2003 | Ando |
| 2003/0088775 | A1 | 5/2003 | Weimerskirch |
| 2003/0098345 | A1 | 5/2003 | Kobayashi et al. |
| 2003/0103645 | A1 | 6/2003 | Levy et al. |
| 2003/0110126 | A1 | 6/2003 | Dunkeld et al. |
| 2003/0112974 | A1 | 6/2003 | Levy |
| 2004/0001606 | A1 | 1/2004 | Levy |
| 2004/0022412 | A1 | 2/2004 | Iwamura et al. |
| 2004/0117629 | A1 | 6/2004 | Koto et al. |
| 2004/0169892 | A1 | 9/2004 | Yoda |

FOREIGN PATENT DOCUMENTS

| | | |
|---|---|---|
| WO | WO 01/05075 | 1/2001 |
| WO | WO 0106703 | 1/2001 |
| WO | WO0176253 | 10/2001 |
| WO | WO0207425 | 1/2002 |
| WO | WO0207442 | 1/2002 |
| WO | WO02/19589 | 3/2002 |
| WO | WO 02/37489 | 5/2002 |

OTHER PUBLICATIONS

Graser, "Paranoid Hollywood Wracked by Hack Attacks," Aug. 8, 2001, as reprinted by InfoSec News Aug. 9, 2001.

Sandford II, et al., "The Data Embedding Method," SPIE vol. 2615, Oct. 23, 1995, pp. 226-259.

Zhao, "A WWW Service to Embed and Prove Digital Copyright Watermarks," In Proc. of the European Conf. on Multimedia Applications, Services and Techniques, Louvain-La-Neuve, Belgium, May 1996, 14 pages.

Zhao, "WWW Copyright Labeling & Verification Service," (URL: http://sagittarius.igd.fhg.de:64325) Fraunhofer-IGD, Wilhelminenstr.7, D-64283 Darmstadt, 1 page, Oct. 1995.

Zhao et al, "Embedding Robust Labels into Images for Copyright Protection," Aug. 1995, Proc. Of the International Congress on Intellectual Property Rights for Specialized Information, Knowledge and New Technologies, 10 pages.

Ohnishi J. et al., "A method of watermarking with multiresolution analysis and pseudo noise sequence," Systems and Computers in Japan, vol. 29, No. 5, May 1998, pp. 11-19.

Sep. 8, 2005 Notice of Allowance (including a Detailed Action and Examiner Search strategies); May 19, 2005 Amendment and May 17, 2005 Interview Summary; all from assignee's U.S. Appl. No. 10/278,742 (now U.S. Patent No. 7,006,661).

Apr. 22, 2005 Office Action; Oct. 21, 2004 Status Letter; Sep. 2, 2004 Preliminary Amendment; all from assignee's U.S. Appl. No. 10/278,742 (now U.S. Patent No. 7,006,661).

May 13, 2004 Amendment Accompanying RCE; Feb. 28, 2004 Notice of Allowance (including Examiner's search strategy); Dec. 3, 2003 Amendment; and Sep. 5, 2003 Office Action; all from assignee's U.S. Appl. No. 10/278,742 (now U.S. Patent No. 7,006,661).

Hartung et al., "Digital Watermarking of MPEG-4 Facial Animation Parameters," Computers & Graphics, vol. 22, No. 3, 1998, 17 pages.

Hartung, et al., "Digital Watermaking of Raw and Compressed Video," Digital Compression Technologies and Systems for Video Communication, pp. 205-213, Oct. 1996.

Hartung et al., "Watermarking of Uncompressed and Compressed Video," Signal Process, vol. 66, No. 3, May 1998, pp. 283-301.

Matsui, "Video-Steganography: How to Secretly Embed a Signature in a Picture," Apr. 1993, Proc. Technological Strategies for Protecing Intellectual Property in the Networked Multimedia Environment, vol. 1, issue 1, Jan. 1994, pp. 187-205.

Komatsu, "A Proposal on Digital Watermark in Document Image Communication and Its Application to Realizing a Signature," Nov. 1990, Electronics and Communications in Japan, Part 1, vol. 73, No. 5, pp. 22-33.

Komatsu, "Authentication System Using Concealed Image in Telematics," Oct. 1998, Memoirs of the School of Science and Engineering, Waseda Univ., No. 52, pp. 45-60.

Aug. 25, 2006 Notice of Allowance (including Examiner's search strategies); Jun. 27, 2006 Amendment after Final Rejection; Jan. 13, 2006 Notice of Allowance; all from assignee's U.S. Appl. No. 09/404,292 (now U.S. Patent No. 7,197,156).

Aug. 30, 2005 Amendment accompanying RCE; Jun. 3, 2005 Notice of Allowance (including search strategy); May 9, 2005 Amendment; Dec. 10, 2004 Amendment; and Dec. 8, 2004 Office Action; all from assignee's U.S. Appl. No. 09/404,292 (now U.S. Patent No. 7,197,156).

Aug. 3, 2004 Amendment; Mar. 3, 2004 Office Action (including search strategies); Feb. 10, 2004 Amendment; May 20, 2003 Office Action (including interview summary and search strategies); all from assignee's U.S. Appl. No. 09/404,292 (now U.S. Patent No. 7,197,156).

Feb. 26, 2003 Amendment; Aug. 28, 2002 Office Action (including search strategies); Jul. 22, 2002 Response and Preliminary Amendment; and Jun. 20, 2002 Office Action; all from assignee's U.S. Appl. No. 09/404,292 (now U.S. Patent No. 7,197,156).

Mar. 7, 2007 Notice of Allowance (including an interview summary and search strategies); Nov. 27, 2006 Amendment; Nov. 3, 2006 Office Action (including search strategies); all from assignee's U.S. Appl. No. 09/810,080 (now U.S. Patent No. 7,373,513).

Jun. 27, 2006 Amendment After Final Rejection; May 31, 206 Office Action (including search stratgies); Mar. 7, 2006 Amendment; and Nov. 10, 2005 Office Action; all from assignee's U.S. Appl. No. 09/810,080 (now U.S. Patent No. 7,373,513).

Aug. 4, 2005 Amendment Accompanying RCE; May 4, 2005 Office Action (including search strategies); Dec. 10, 2004 Amendment; Aug. 10, 2004 Office Action; all from assignee's U.S. Appl. No. 09/810,080 (now U.S. Patent No. 7,373,513).

* cited by examiner

DIGITAL WATERMARKING SYSTEMS AND METHODS

RELATED APPLICATION DATA

This application is a continuation of U.S. patent application Ser. No. 10/278,742, filed Oct. 21, 2002 (published as US 2003-0138127 A1), which is a continuation-in-part of co-pending U.S. patent application Ser. No. 10/017,678, which is a continuation of U.S. patent application Ser. No. 09/597,209 (now U.S. Pat. No. 6,411,725). The Ser. No. 09/597,209 application is a continuation-in-part of U.S. patent application Ser. No. 09/408,902 (now U.S. Pat. No. 6,408,331), which is a division of U.S. patent application Ser. No. 09/130,624 (now U.S. Pat. No. 6,324,573), which is a continuation of U.S. patent application Ser. No. 08/508,083 (now U.S. Pat. No. 5,841,978). The Ser. No. 10/278,742 application also claims the benefit of U.S. Provisional Patent Application No. 60/349,970, filed Oct. 19, 2001.

BACKGROUND AND SUMMARY OF THE INVENTION

In a recent article, "Paranoid Hollywood Wracked by Hack Attacks," author Marc Graser reported that "[h]ollywood is experiencing the revelation that everything it saves on a computer is available to prying eyes at any time. Nothing is safe. Paranoia is running rampant. Through legal (and freely accessible) software, anyone with a computer and an Internet connection can enter studio databases containing the most private information." (Reuters distributed Graser's article on Aug. 8, 2001.).

Graser continued "[r]ecent breaches have allowed hackers to exchange: rough-cuts of Warner Bros.' "Ocean's 11" and Columbia Pictures' Jet Li actioner "The One"; emails among executives at Warner Bros. TV; scripts transferred from production companies such as Bruckheimer Films; databases at agencies like Creative Artists Agency, Endeavor and William Morris; personal records at law corporations and accounting offices; and digitally stored media at New Line and VDI Multimedia." (See id.).

Piracy is raking showbiz in the tune of $1 trillion in damages annually. The film industry is losing $2.5 billion a year to piracy and the music industry is losing an additional $4.1 billion per year. (See id.).

Yet the biggest threat comes from money-hungry professionals, and company employees are increasingly to blame. See id. Graser reports that most companies do not realize that 90% of the attacks performed on the systems they try so hard to protect are the result of inside jobs.

A solution is needed to help curve the onslaught of movie theft and piracy, particularly theft from film studios and editing facilities.

Digital Watermarking can provide a deterrence and tracking solution.

Digital watermarking technology, a form of steganography, encompasses a great variety of techniques by which plural bits of digital data are hidden in some other object, preferably without leaving human-apparent evidence of alteration.

Digital watermarking may be used to modify media content (audio, video, images, etc.) to embed a machine-readable code into the media content. The media may be modified such that the embedded code is imperceptible or nearly imperceptible to a viewer, yet may be detected through an automated detection process.

There are many processes by which media content can be processed to encode a digital watermark. In media (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present Assignee's U.S. Pat. No. 6,122,403 and application Ser. No. 09/503,881 (now U.S. Pat. No. 6,614,914) are illustrative of certain watermarking technologies. Of course, artisans in the digital watermarking field are familiar with other technologies that are suitably interchangeable with some aspects of the present invention.

Digital watermarking systems typically have two primary components: an embedding component that embeds a watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark.

One problem that arises in many watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The Assignee's U.S. patent application Ser. Nos. 09/503,881 (now U.S. Pat. No. 6,614,914) and 09/452,023 (now U.S. Pat. No. 6,408,082) detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

To provide a comprehensive disclosure without unduly lengthening this specification, each of the patents and patent applications cited in this document are hereby incorporated by reference.

In one implementation of the invention, we provide steganographic markings for studio rough cuts. The marks provide nearly imperceptible identification and forensic tracking clues.

In another implementation, content is marked with serialized or unique codes efficiently using different objects for the content and watermark data via object based encoding systems such as MPEG-4. The watermark object can be efficiently created if the original compressed content is analyzed and perceptual model results and calibration signals that are constant when a watermark payload is changed are saved. This or another forensic embedding system can be used to track content as well as lock content to a recipient. For example, the content may be rendered only if the individual or their rendering device has a secret code that coincides with the embedded ID.

With the foregoing by way of background and summary, the specification next turns to various digital watermarking improvements. It will be recognized that these improvements can typically be employed in many applications, and in various combinations with the subject matter of the patent documents cited herein. These improvements will be more readily apparent from the following detailed description, which proceeds with reference to the accompanying drawings.

DETAILED DESCRIPTION

Figure 1:
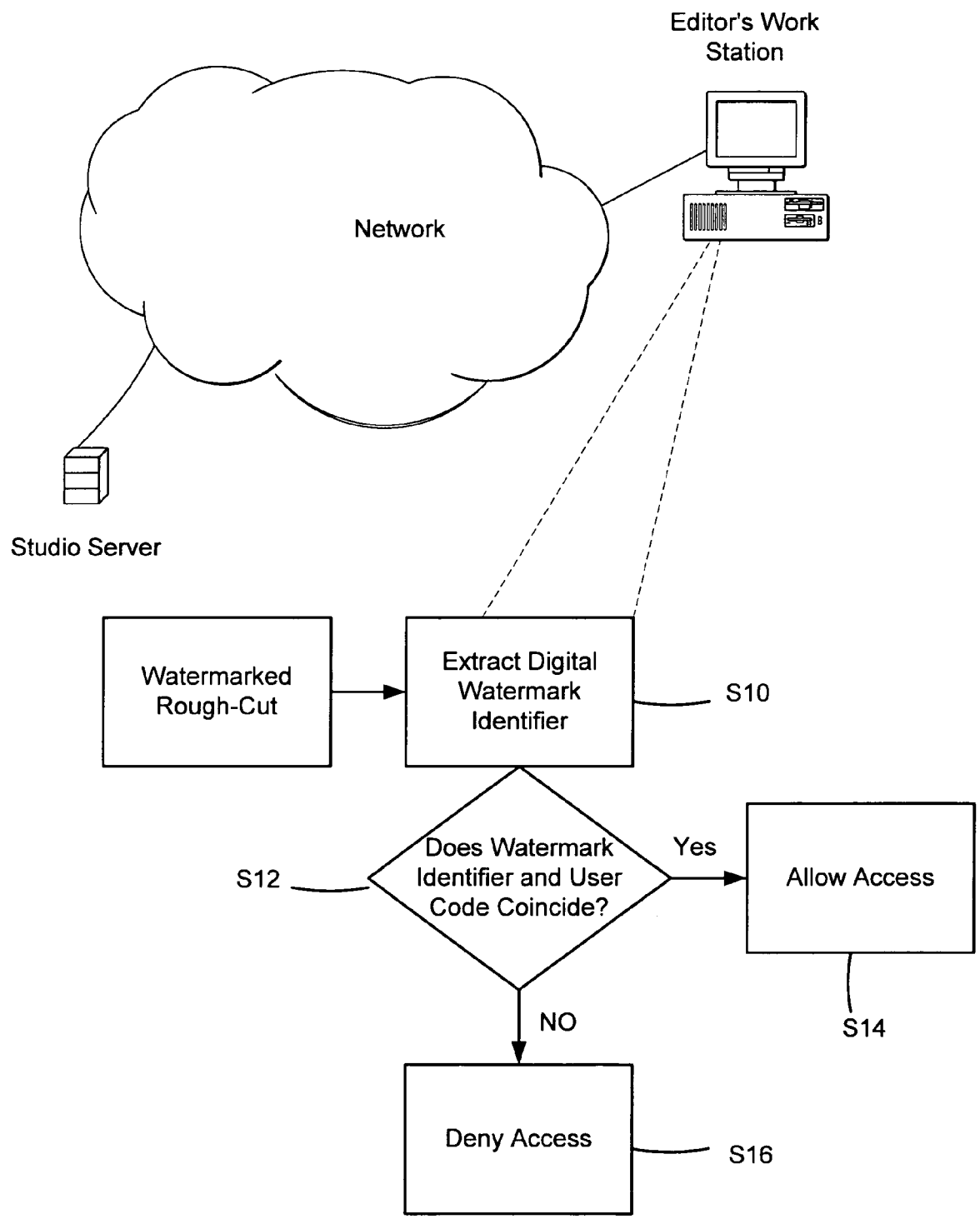
FIG. 1 is a diagram illustrating a network system, including a flow diagram for a security procedure.

Consider a typical film production process. After shooting on location, the resulting film is digitized or converted to a digital format. (Or digital images can be initially captured. Of course, there are special effects and other effects filters (e.g., a flame effect filter) that are essentially produced in the digital domain.). The digitized film (and any special effects scenes) represents the many scenes that will be edited to create a movie, video or other viewing program. We refer to this collection of digital scenes as a "master cut." This master cut can be further refined into so-called rough-cuts, in which a movie sequence begins to take shape.

Often, rough-cuts are provided to editors and effects specialists. Similarly, rough-cuts are often provided to directors, critics, executives, advertisers, etc. One aspect of the present invention helps to identify and track rough-cuts as they are distributed from a studio.

A conventional security feature provides a digital "bug" or label that visually appears in a corner (or other) screen position of a rough-cut. Or the rough-cut includes a visible banner-like text message throughout each scene or frame. These techniques are easily defeated by pirates through simple cropping and editing techniques.

According to one aspect of the present invention, a rough-cut is digitally watermarked, particularly when communicated to a non-secure location. Even rough-cut copies that are "checked-out" as a file, instead of rendering (or streaming) to a network workstation, can be digitally watermarked. The digital watermark is preferably redundantly embedded throughout the rough-cut, or the watermark can be placed in only specific frames or placed to cover certain film segments or video objects. Preferably, the digital watermark includes an identifier. Suitable watermarking techniques are disclosed in the applications and patents mentioned above. In some implementations, other digital watermarking techniques can be suitably interchanged with this aspect of the present invention, so long as the watermark conveys sufficient payload capacity.

A digital watermark identifier preferably uniquely identifies a rough-cut version (e.g., cut 1 of 12, date/time, editing details, distribution trail, etc.). Alternatively (or additionally), the identifier uniquely identifies a party to which the rough-cut is being transferred. The identifier is stored in a database or other record to facilitate tracking. The identifier is associated in the database with information relating to the rough-cut or to the receiving party. (The data record can include additional information such as time of rough-cut checkout, distribution/rendering channel, usage restrictions, etc.). Thereafter, when the rough-cut is found in an unexpected or unauthorized location, e.g., a web site, video store shelf, competitor's studio, counterfeited DVD, etc., the embedded watermark identifier is extracted and used to interrogate the database. The database information is retrieved and the source of the leak or distribution channel can be identified.

In another embodiment, the identifier is used as a security feature to prevent unauthorized viewing or handling. With reference to FIG. 1, a rough-cut is transferred from a network studio to a user workstation (e.g., editor, director, etc.) via a network. The transfer can occur through a conventional network, such as a wide area network, local area network, private network, wireless network, or even the Internet. Alternatively, the user receives the rough-cut on physical media. The rough-cut includes a digital watermark embedded therein. Of course, a digital watermark can be redundantly embedded throughout the cut.

Access to the rough-cut is regulated by a software security application operating on the user's workstation. The software security application can be integrated with software editing tools such as Adobe Premier, Affects Effects and Media100 products, among others. The security software preferably includes (or cooperates with) a digital watermark reader. The reader can be a plug-in or an independent software application. The watermark reader extracts the digital watermark identifier (S10) from the rough-cut and the user is prompted to enter a corresponding code. The code is preferably rough-cut specific in that a user has (or receives from a studio) a code that corresponds only to a digital watermark identifier embedded in her rough-cut. Once entered, the watermark detector determines whether the identifier and code coincide (S12). If the code and watermark identifier coincide, the user is granted access to the rough-cut (S14). Else, the user is denied access (S16). The code and watermark ID need not perfectly match to coincide. Indeed, the code and identifier can be related via a hash, mathematical relationship or algorithm. Or the code/identifier can be related by a symmetrical or asymmetrical encryption key.

In other implementations, the code is cached on the editor's computer (or video rendering device), e.g., like storing so-called web cookies that securely store account IDs and passwords on a user's terminal, so the code does not need to be manually entered each time. In addition, the code can be locked (or tied) to a computer, such as including the date of a Windows garbage can. In one implementation, the computer is secure, requiring the user to enter a password and/or pass biometrics, such as a fingerprint scan or security dongle or card, such that other users do not have access to the cached ID. In other words, only a specified user can use the cached ID, even though it is stored on the PC since the cache is locked for access only by a qualifying PC user. In another implementation, the code is implicitly part of a computer system, such as a private cryptography key. In this case, the code is used to decrypt or otherwise unscramble the rough-cut or the digital watermark embedded in the rough cut or both.

As will be appreciated, an editing process typically involves the creation of an instruction set, which is used to create a final cut. The instruction set outlines (e.g., by codes or markers) the editor's edits, cuts, etc. Most often the instruction set is applied against a high quality cut to create the final cut (or further rough-cuts). Of course, a final cut can likewise be watermarked.

In still another implementation of this aspect of the present invention, an editor's rendering device (e.g., personal computer executing editing software instructions, set-top-box or other device) embeds a watermark identifier in a rough-cut. The identifier is preferably unique to the editor or to a team of editors. Accordingly, if the rough-cut is discovered in an unanticipated or unauthorized channel, the watermark identifier, once extracted, can be used to track the source of the leak.

Consider a modification of this implementation for adaptation to a peer-to-peer (P2P) network environment. When presenting a pre-release movie clip in a P2P network, e.g., like x-ShareThis, every ShareThis client that handles (or routes) the movie clip digitally watermarks the clip with a unique identifying watermark (e.g., a unique serial number, etc.). Illegal or unauthorized copies of the movie clip can be traced through the peer lineage of the unique identifiers.

Transactional Watermarks: A System Level Approach

Forensic tracking can be facilitated by watermarking each version or content copy with a transaction ID. Content is defined broadly herein and may include audio, video, data, images or multimedia combinations. A transaction (or dynamic) identifier preferably includes multi-bit data that uniquely identifies a user, a user device or a transaction. In some cases the transaction identifier serves as a database interrogator to retrieve additional information. (Forensic tracking involves identifying content and/or tracking a distribution source or history of the content. Forensic tracking can also involve uniquely serializing content to a user or user device. Forensic tracking is particularly helpful in identifying content or a distribution source when the content is discovered in an unexpected or unauthorized channel or location.). A content owner may want a serial account of each content copy, or to tie the content to an end-user or playing device ID. This requirement means that the content is preferably watermarked on the fly at the server with video streamed over IP, or at a set-top box (STB) in broadcast video system.

Some robust watermark embedding algorithms are too computationally intensive for this approach and/or adversely degrade content. For broadcast video, a set-top-box (STB) is designed to be as inexpensive as possible, but for use in a watermark embedding/decoding system, the STB must contain enough computational resources for a watermark embedder and/or decoder. For video streamed over IP, compressed content is often digitally watermarked on a server, which may require the content to be decompressed, watermarked and re-compressed. These steps are not only computationally intense but may also degrade the content.

Looking at a complete system, we have invented improvements for efficiently embedding a transaction ID in content. Our improvements are discussed below.

Watermarking Compressed Content

Digitally watermarking compressed audio, video or images, where a watermark ID can dynamically change (e.g., potentially to identify a user, transaction or requesting/rendering device), presents computational and content degradation (due to a re-compression) challenges. Conventional approaches often require content to be decompressed, watermark and recompressed.

Our improvements and solutions to these challenges are expressed in the following two embodiments.

First Embodiment

Our first embodiment is discussed with reference to FIG. 2. Compressed content 100 is decompressed 110. A watermark including a dynamic identifier 140 is determined (or constructed) for the decompressed content 120. Preferably, a dynamic identifier (or transaction identifier) uniquely identifies a particular user or user device. Or the dynamic identifier can be unique to a particular transaction in a receipt-like manner. Optionally, the dynamic identifier is associated in a database with additional information such as user information, distribution channel, content usage rights, transaction details, account information, etc. (Once decoded, the dynamic identifier is used to interrogate the database to retrieve the additional information.). The watermark is compressed as a separate object 130, such as defined in MPEG-4, without being embedded in the decompressed content. Two objects—namely the original compressed content and the compressed watermark—are communicated to a rendering device (e.g., personal computer, media player, set-top-box, DVD, or other consumer device) 150. In one example, a copy of the original compressed content 100 is retained, so as to avoid recompressing the decompressed original content. The objects can be communicated via a network, such as the Internet or a LAN or WAN. In a network environment, steps 100-140 are preferably carried-out on a network server.

The rendering device combines the two objects 160. For example, the objects can be decompressed and the content can be embedded with the watermark by a watermark embedded associated with the rendering device. The watermark object can include embedding hints, such a spatial or frequency-embedding clues, start sequences or points, etc. Or the two objects can be associated or linked together, e.g., with a header or file structure. Still further, the content and watermark can be otherwise combined, e.g., during rendering or storing.

The first embodiment associates a dynamic ID with content without recompressing the original content. The decompressed content 110 can be optionally saved on the network server so that the decompressing step is skipped for following transactions involving the same original content, thus reducing computational requirements.

Although not required, it is preferable that the two objects, i.e., the original compressed content and the compressed watermark, are delivered as a secure stream to a secure player (or rendering device) so that a would-be pirate cannot restrict or separate the watermark from the content.

Second Embodiment

Figure 2:
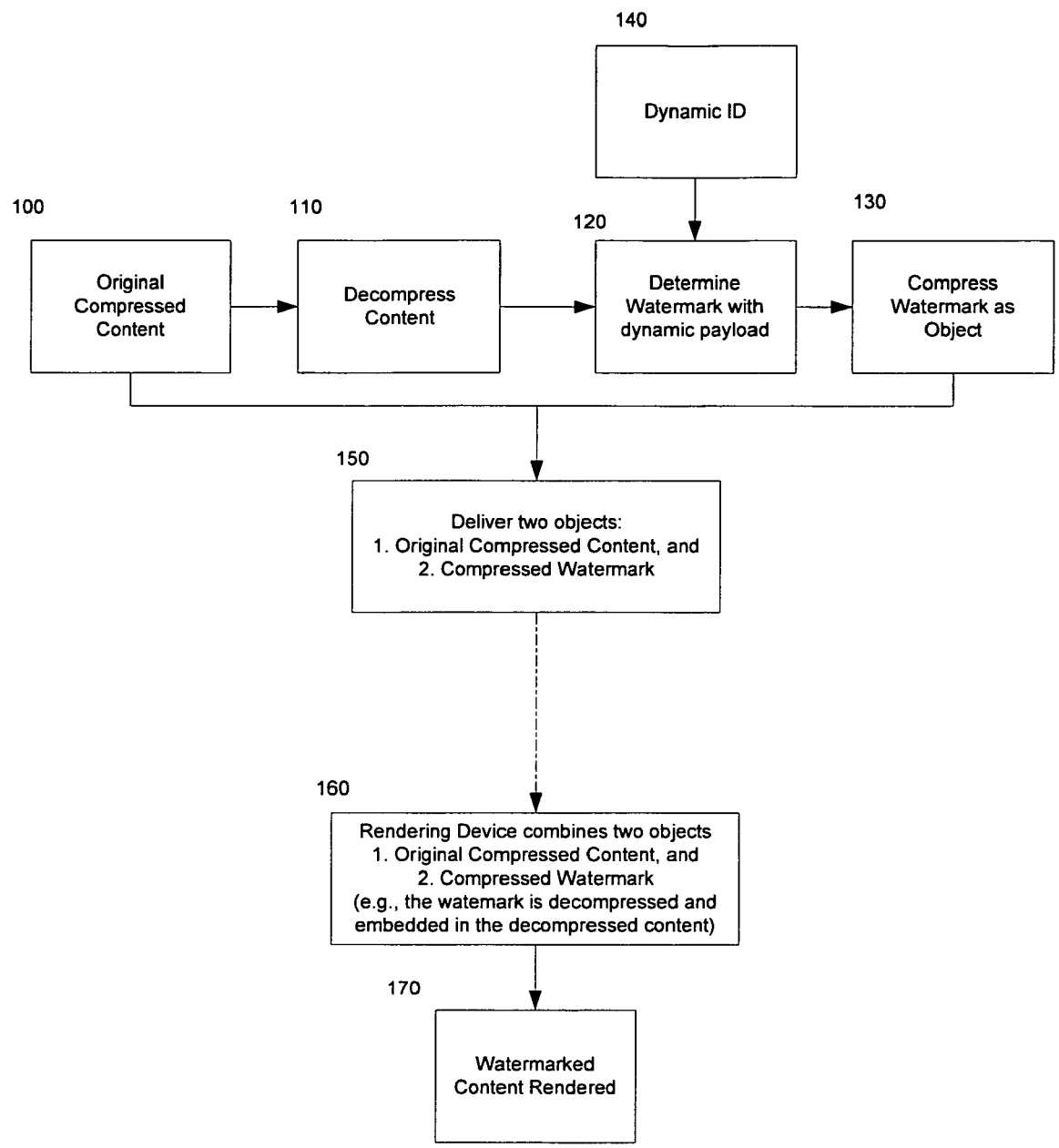
FIG. 2 is a block diagram illustrating a transaction procedure.

Our second embodiment is described with reference to FIG. 3, where like stages/steps are numbered with the same reference numbers as shown in FIG. 2. This embodiment includes a pre-computation stage, where original compressed content 100 is decompressed 110. Static watermark features and/or embedding instructions are determined 220. For example, the static watermark signal many include features based on perceptual modeling of the content, or may include watermark orientation or reference signals. The watermark features (e.g., perceptual model and/or orientation signal) are saved in a related file 230. Preferably, the related file contains those watermarking features that do not change when the transactional (or dynamic) ID changes. With these features saved in related file 230, the original content does not need to be again de-compressed. Overall computational time can be reduced by saving such a related file in the pre-computational stage. This related file 230 is preferably saved for future requests for the same original content 100, saving additional computational time.

Then, in a transaction stage, where the content 100 is delivered to a user, a watermark is efficiently created 120 using the related file 230 (including the perceptual model and/or orientation signal). The watermark preferably includes a watermark identifier based on a dynamic ID 140. As in the first embodiment, the dynamic or transactional ID uniquely identifies the user, user device or the transaction. The watermark is compressed 130 and sent as an object with the original compressed content 150 as discussed above with respect to FIG. 2. As such, in the transaction stage, the original compressed file need not be decompressed. In other words, the content file needs to be decompressed and analyzed for perceptual features only once, while the distributed versions can be watermarked with numerous IDs.

Additionally, in step 160, the watermark can efficiently be read before being added to the content. This reading will be very efficient and robust. Even if the watermark is read after being combined with the content, the watermark ID can be used to produce so-called hot-branding, where a related central database produces a dynamic brand logo to appear with the content, such as a logo in video or images and audio with audio.

Modifications

We also envision that the original compressed content may be encrypted. When encrypted, decryption does not have to be performed, except initially in the pre-computational stage when the related file 230 is created. This is both more efficient and more secure than having to decrypt the content to add the watermark during each subsequent transaction. As with the first embodiment, if the decompressed content is saved, the system is more efficient, but not necessarily more secure since non-secure content is available on the server.

Figure 3:
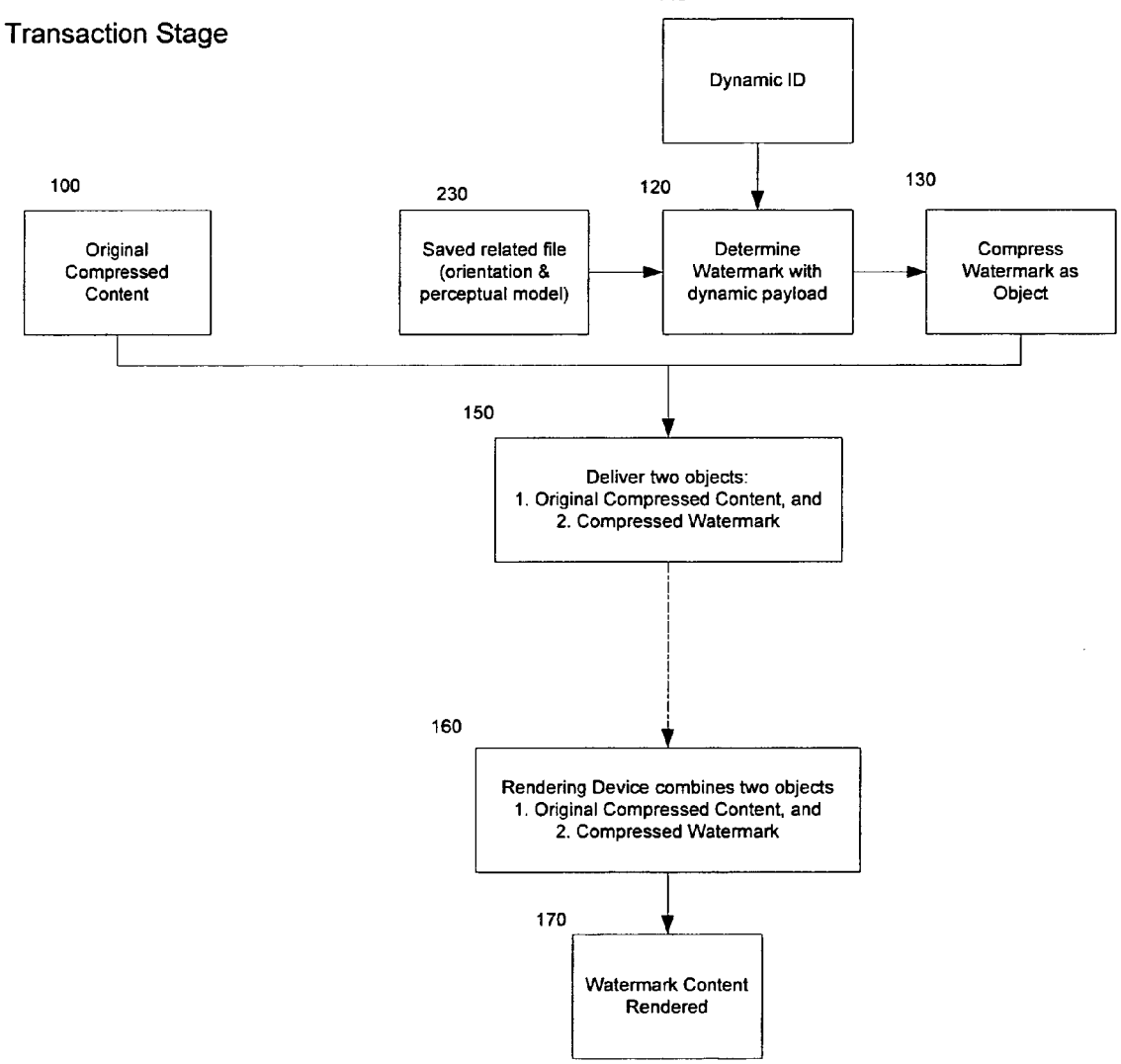
FIG. 3 is a block diagram illustrating another transaction procedure, include a pre-computational stage.

As an optional feature for the FIG. 2 and FIG. 3 embodiments, the content is embedded with a watermark content ID, and optionally with a distributor ID, before it is broadcast or streamed. This process need only occur once and not each time it is streamed. For example, a watermark-embedding step is included after decompression 110. Or the illustrated transaction processes act on compressed content that has been previously watermarked. The individual dynamic or transaction ID is then determined according to the FIG. 2 and FIG. 3 embodiments.

As will be appreciated, in the FIG. 2 and FIG. 3 embodiments, the original content and watermark objects are securely combined at a rendering device, thus creating a uniquely identified content display (e.g., such as a video display).

It also should be appreciated that the FIG. 2 and FIG. 3 transaction systems are envisioned to handle many transfers of the same original content to many different users (or rendering devices). A unique dynamic or transaction identifier is preferably generated for each transfer or for each user.

With reference to FIG. 2, in an alternative embodiment, the original content 100 includes a digital watermark, and the watermark is extracted and supplemented with a dynamic (or transactional) identifier in step 120.

CONCLUSION

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, each of the above-mentioned patents and patent applications, along with U.S. patent application Ser. No. 09/574,668 (now U.S. Pat. No. 6,522,769), Ser. Nos. 09/620,019, 09/636,102, 60/257,822, and 09/574,668 (now U.S. Pat. No. 6,522,769), are hereby incorporated by reference. Applicants also herein incorporate by reference Assignee's U.S. Patent Application titled "Integrating Digital Watermarks in Multimedia Content," filed Oct. 21, 2002 (now application Ser. No. 10/277,617, published as US 2003-0103645 A1). The particular combinations of elements and features in the above-detailed embodiments are exemplary only; the interchanging and substitution of these teachings with other teachings in this application and the incorporated-by-reference patents/applications are expressly contemplated.

Many of the above-described methods and related functionality can be facilitated with computer executable software stored on computer readable media, such as electronic memory circuits, RAM, ROM, EPROM, flash memory, magnetic media, optical media, magnetic-optical media, memory sticks, hard disks, removable media, etc., etc. Such software may be stored and/or executed on a general-purpose computer, or on a server for distributed use. Also, instead of software, a hardware implementation, or a software-hardware implementation can be used.

While the first aspect of the present invention has been described with respect to editor rough-cuts, the invention is not so limited. Indeed, any movie segment, trailer, preview, or confidential documents can be watermarked. Also, while the rough-cuts are described as if in a digital format, they need not be so. Instead, the rough-cuts can be film, which includes a digital watermark identifier embedded therein. It also should be appreciated that the watermark embedding can occur while the rough-cut is being rendered.

Also, a studio rough-cut can include a plurality of watermarks. For example, the rough-cut may include a content identifying watermark, which uniquely identifies the content, and a user specific watermark, which uniquely identifies the user. The studio rough-cut can also include a so-called semi-fragile digital watermark. A semi-fragile watermark is designed such that it can withstand routine signal processing (e.g., compression) but is destroyed or degrades predictably with a malicious attack. The status of a fragile watermark in a studio rough-cut will help to announce a copy.

In view of the wide variety of embodiments to which the principles and features discussed above can be applied, it should be apparent that the detailed embodiments are illustrative only and should not be taken as limiting the scope of the invention.

What is claimed is:

1. A method comprising:
receiving a compressed video object;
decompressing the compressed video object to yield a decompressed video object;
determining a digital watermark signal for the decompressed video object, but instead of embedding a determined digital watermark signal in the decompressed video object, compressing the digital watermark signal as an object; and associating the digital watermark object and the compressed video object.

2. The method of claim 1, further comprising: providing the associated video object and digital watermark object to a rendering device.

3. The method of claim 2, wherein the rendering device is to decompress the video object and decompress the digital watermark object, and then embed the decompressed digital watermark into the decompressed video, the embedding occurring prior to rendering of the video.

4. The method of claim 3, wherein the digital watermark comprises at least one of an orientation component or perceptual model of the video, and wherein the embedding is to use at least one of the orientation component and perceptual model.

5. The method of claim 4, wherein the embedding is to use both of the orientation component and perceptual model.

6. The method of claim 1, wherein the digital watermark object is to be detected independently of the video object.

7. The method of claim 1, wherein the digital watermark object and the video object each comprise MPEG-4-based objects.

8. The method of claim 1, wherein the digital watermark comprises a unique identifier.

9. A method comprising:
providing video content, wherein the video content comprises a digital watermark embedded therein, with multiple instances of the digital watermark embedded in the video content, the digital watermark further comprising a plural-bit identifier that is uniquely associated with an intended recipient of the video content;
encrypting the video content with an encryption key that comprises mathematical relationship to the plural-bit identifier that is uniquely associated with the intended recipient of the video content;
providing a decryption key that comprises a cryptographic relationship to the encryption key;
providing the encrypted video content and the decryption key to the intended user of the video content; and
maintaining a registry that associates at least the plural-bit identifier with the intended recipient.

10. The method of claim 9 wherein the video content comprise multiple, different digital watermarks embedded therein.

11. The method of claim 9 wherein the video content comprises audio and video portions.

12. The method of claim 9 wherein the certain portions correspond to different video frames.

13. The method of claim 9 wherein the digital watermark is embedded only in certain portions, but not in all portions, of the video content.

14. The method of claim 9 wherein the digital watermark is redundantly embedded throughout the video content.

15. The method of claim 9 wherein the encrypted video content and the decryption key are separately provided to the intended user of the video content.

16. The method of claim 9 wherein the video content comprises a rough-cut.

17. The method of claim 9 wherein the video content comprises a non-final version.

18. A machine-readable medium storing instructions to perform the method of claim 1.

19. A machine-readable medium storing instructions to perform the method of claim 9.

20. An apparatus comprising:
an input to receive a compressed video object;
a module including circuitry or instructions to decompress the compressed video object to yield a decompressed video object;
a controller to determine a digital watermark signal for the decompressed video object, but instead of embedding a determined digital watermark signal in the decompressed video object, the controller controls: i) compression of the digital watermark signal as an object, and ii) association of the digital watermark object and the compressed video object.

* * * * *